(12) United States Patent
Niedermeier

(10) Patent No.: US 11,614,411 B2
(45) Date of Patent: Mar. 28, 2023

(54) APPARATUS FOR INSPECTING CONTAINERS, IN PARTICULAR CANS

(71) Applicant: KRONES AG, Neutraubling (DE)

(72) Inventor: Anton Niedermeier, Offenstetten (DE)

(73) Assignee: KRONES AG

( * ) Notice: Subject to any disclaimer, the term of this patent is extended or adjusted under 35 U.S.C. 154(b) by 68 days.

(21) Appl. No.: 16/755,772

(22) PCT Filed: Oct. 11, 2018

(86) PCT No.: PCT/EP2018/077778
§ 371 (c)(1),
(2) Date: Apr. 13, 2020

(87) PCT Pub. No.: WO2019/072989
PCT Pub. Date: Apr. 18, 2019

(65) Prior Publication Data
US 2020/0278302 A1    Sep. 3, 2020

(30) Foreign Application Priority Data
Oct. 11, 2017   (DE) .................... 10 2017 123 684.8

(51) Int. Cl.
*G01N 21/90*  (2006.01)
*G01N 21/88*  (2006.01)
*G02B 23/24*  (2006.01)

(52) U.S. Cl.
CPC ....... *G01N 21/909* (2013.01); *G01N 21/8806* (2013.01); *G02B 23/2461* (2013.01)

(58) Field of Classification Search
CPC .......... G01N 21/8806; G01N 21/9072; G01N 21/909; G02B 23/2461; G03B 15/03; G03B 37/005
See application file for complete search history.

(56) References Cited

U.S. PATENT DOCUMENTS 4,283,145 A * 8/1981 Miyazawa ............. G01N 21/90
                                                    359/201.1
4,682,023 A * 7/1987 Yoshida ............. G01N 21/9054
                                                    250/223 B (Continued)

FOREIGN PATENT DOCUMENTS

DE   693 10 321   10/1997   ............. G01N 21/88
DE   202 12 577   11/2002   ............. G01N 21/90

(Continued)

OTHER PUBLICATIONS

International Search Report and Written Opinion issued in PCT/EP2018/077778 dated Jan. 30, 2019 with English translation of Search Report, 13 pgs.

*Primary Examiner* — Dominic J Bologna
*Assistant Examiner* — Jarreas C Underwood
(74) *Attorney, Agent, or Firm* — Hayes Soloway P.C.

(57) ABSTRACT

A device for inspecting containers which have an opening includes a transport device which transports the objects along a configured transport path. The device includes a monitoring device which is configured to monitor at least one region of an inner wall of the container through the opening. The monitoring device is configured to capture spatially resolved images, and has a lighting device configured to illuminate at least one region of the inner wall, is arranged between the monitoring device and the container.

15 Claims, 4 Drawing Sheets

(56) References Cited

U.S. PATENT DOCUMENTS

| | | | | |
|---|---|---|---|---|
| 4,924,107 | A | 5/1990 | Tucker | 250/572 |
| 5,220,400 | A * | 6/1993 | Anderson | G01N 21/909 356/240.1 |
| 5,451,773 | A * | 9/1995 | Triner | G01N 21/9036 356/240.1 |
| 5,592,286 | A * | 1/1997 | Fedor | G01N 21/909 356/240.1 |
| 5,699,152 | A * | 12/1997 | Fedor | G01N 21/909 356/240.1 |
| 6,122,048 | A * | 9/2000 | Cochran | G01N 21/909 356/240.1 |
| H1979 | H * | 8/2001 | Hopkins | 356/334 |
| 6,654,116 | B1 * | 11/2003 | Kwirandt | G01N 21/909 356/240.1 |
| 7,796,276 | B2 | 9/2010 | Schipke et al. | 356/601 |
| 9,151,707 | B2 | 10/2015 | Lindner | G01N 21/00 |
| 9,867,890 | B2 | 1/2018 | Heuft | A61L 2/10 |
| 2002/0196434 | A1 * | 12/2002 | Takakusaki | G01N 21/909 356/240.1 |
| 2006/0098840 | A1 * | 5/2006 | De Toni | G07D 7/121 382/100 |
| 2006/0153438 | A1 | 7/2006 | Sones et al. | 382/143 |
| 2010/0033578 | A1 * | 2/2010 | Forestier | G02B 23/12 348/E5.09 |
| 2012/0147366 | A1 * | 6/2012 | Niedermeier | G01N 21/90 356/240.1 |
| 2014/0226005 | A1 * | 8/2014 | Herrmann | G01N 21/27 356/402 |
| 2019/0170991 | A1 * | 6/2019 | Seesselberg | G02B 21/0072 |
| 2020/0278302 | A1 * | 9/2020 | Niedermeier | G03B 15/03 |

FOREIGN PATENT DOCUMENTS

| | | | |
|---|---|---|---|
| DE | 10 2005 014 415 | 3/2007 | G01N 21/954 |
| DE | 10 2010 043 632 | 5/2012 | B08B 9/46 |
| DE | 10 2014 005 650 | 10/2015 | G01N 21/90 |
| EP | 0 362 679 | 4/1990 | G01N 21/88 |
| EP | 0 599 335 | 11/1993 | G01N 21/99 |
| JP | 2012026858 A * | 2/2012 | |
| WO | WO-2004081550 A1 * | 9/2004 | G01N 21/9018 |

\* cited by examiner

APPARATUS FOR INSPECTING CONTAINERS, IN PARTICULAR CANS

BACKGROUND OF THE INVENTION

The present invention relates to an apparatus and a method for inspecting objects and in particular for inspecting the interiors of objects and in particular containers, for example cans. Various apparatuses and methods for inspecting such containers are known from the prior art. In this case the invention relates in particular to such containers which have reflecting, for example metallic inner walls, such as in particular but not exclusively cans.

In this case it is known from the internal prior art that for the inspection of cans an objective with a pupil arranged in front is used. This may be understood to mean that an objective preferably has a focal point which is not located in the can itself but is arranged in front of the actual objective. The objective is in particular an objective which serves for images of inner walls of containers and in particular of cans to be recorded. In this case it is likewise known that a plurality of light sources are arranged in the surroundings of the objective for example on the external circumference of the objective.

Depending upon the geometry of the can, different light sources can also be addressed. With this method of inspection the inner cylinder wall and also the base of the can are checked for irregularities or contaminants. In addition it is also possible for a can flange onto which a can lid is crimped to be examined with respect to ovality, dents or dirt. With this procedure in some instances the setting of the light sources poses problems, since in particular with a shiny internal surface it happens that individual light sources can be seen as bright spots in a camera image.

Therefore the object of the present invention is to provide an apparatus and a method which simplifies the inspection of such containers, in particular cans.

SUMMARY OF THE INVENTION

An apparatus according to the invention for inspecting objects and in particular containers having an opening has a transport device which transports the objects along a predetermined transport path. Furthermore, the apparatus has a monitoring device which is suitable and intended to monitor at least a region of the inner wall of the object through the opening of the object, wherein the monitoring device is suitable and intended for accommodating spatially resolved images. Furthermore, the apparatus has an illumination device which illuminates at least one region of the inner wall.

According to the invention the illumination device is arranged between the monitoring device and the object.

In the prior art an illumination of the object usually takes place obliquely from the background of the objective. This is advantageous in order in particular to prevent the direct entry of light into the monitoring device, for example the camera, but also has the disadvantage that it can lead to unwanted reflections, in particular on the metallic internal surfaces of the object. In particular the illumination device is arranged in a beam path or at least in a plane through which the beam path extends between the object and the monitoring device.

The transport device can be for example a conveyor belt on which the objects stand. However, it would also be possible that the objects are gripped on their side faces. This is preferably a transport device which transports the objects along a rectilinear transport path. However, transport for instance along a circular transport path would also be possible.

In a further advantageous embodiment the transport device is suitable and intended to transport the objects continuously. In this case in particular an image capture takes place during transport of the objects. However, a clocked transport would also be possible.

The transport device preferably transports at transport speeds of 120,000-140,000 objects per hour. For this reason only a very small time period is available for the inspection of the individual cans or containers. In this time period a sufficient depth of field should also be achieved. This usually takes place through the setting of an aperture opening which is as small as possible. However, small aperture openings are associated with the loss of light intensity. One possibility is to increase the irradiation time. However, this would in turn lead to increased blurring, in particular because the containers are moving at high speed.

Therefore the object of the invention is in particular also to bring as much light as possible into the interior of the objects. This is also achieved by moving the illumination device very close to the objects and also by the fact that the illumination is a diffuse illumination. The proposed procedure can achieve this. In addition, this also prevents an exit lens of the optical imaging system from having a disruptive effect in the recorded image.

In a preferred embodiment the monitoring device uses irradiation times which are less than 500 μs, preferably less than 200 μs, preferably less than 100 μs, preferably less than 50 μs, preferably less than 20 μs.

In a preferred embodiment a distance between the object, for example an upper rim of the mouth of the object, and the monitoring device and in particular an objective of the monitoring device is greater than 40 mm, preferably greater than 100 mm.

In a further advantageous embodiment this distance between the object, for example an upper rim of the mouth of a can, is less than 240 mm, preferably less than 180 mm. In a further preferred embodiment the image capturing device has a CCD or CMOS image capturing element.

In one advantageous embodiment the illumination device is arranged nearer to an upper rim of the object than to the monitoring device.

In this case it is possible that the illumination device is an active illumination device which itself has light sources for example. However, it would also be possible for the illumination device to be a passive illumination device which in turn is illuminated by other light sources.

In this case it is for example conceivable, as mentioned in greater detail below, that the illumination device has a diffusing element, such as for instance a diffusing plate.

It would also be possible, as explained in greater detail below, that light is optically coupled into the illumination device, for example from one side.

In a preferred embodiment the illumination device has at least one light-emitting diode (LED) as light source. However, it would also be possible for several light sources to be provided, and to be arranged for example in the peripheral direction around the illumination device. In this case it would be possible that these light sources are arranged in the peripheral direction around a (geometric) optical axis.

In a preferred embodiment a plurality of light sources are distributed around an optical axis of the arrangement. The optical axis is also in particular an axis which extends from the monitoring device to the object and which for example also extends coaxially with an axis of symmetry of the object to be monitored.

In a further advantageous embodiment the monitoring device is arranged stationary and the objects move relative to the monitoring device. However, it would also be possible for the monitoring device to move with the objects to be inspected, for example along a circular support.

The object to be inspected is preferably a can, in particular a can from a non-transparent material, that is to say in particular a can having a non-transparent base and side walls. In this case this can may be produced in particular but not exclusively from aluminium. In addition the can may also be produced from steel and/or steel sheet. In a further advantageous embodiment a light source of the illumination device is a pulsating light source, that is to say a light source which is not continuously activated but is activated in each case in particular during monitoring time periods. In this case it is in particular advantageous if the light source and the monitoring device are triggered and/or synchronised with one another, that is to say for example an image capture is initiated just when illumination of the object takes place.

In a further advantageous embodiment the monitoring device has a control device which controls an image capture. In this case this control device controls the image capturing device and/or also the light source and/or the illumination device also having regard to container transport. Therefore images are preferably captured when the objects are located at a precisely defined position relative to the monitoring device. The illumination device is also preferably controlled in a corresponding manner.

In a further advantageous embodiment the illumination device emits diffuse light. In this case for example the illumination device can have a diffusing body such as a diffusing plate which is illuminated by light sources. The object and in particular the interior of a can is diffusely illuminated by this diffuse light. By this diffuse illumination it is possible to prevent reflections of individual light sources from occurring, as is the case in some instances in the prior art.

Thus in order to avoid the bright spots which occur in the prior art, a diffusing illumination device which has a large surface area is particularly preferably provided. Instead of an LED light which is known from the applicant's internal prior art in the form of a dome, optionally with coaxial lighting in the region of the objective, in a preferred embodiment a flat diffusing plate is provided which is illuminated or which uses a flat illumination element. In this case the illumination device may illuminate actively or, as mentioned above, may be optically configured so that light exits from the element. In this case the lighting element can emit its light on one side or on both sides.

In a preferred embodiment the monitoring device has an objective with a pupil arranged in front. In this case this is understood in particular to mean that the objective is designed in such a way that a focal point of the objective is offset relative to the objective in the direction of the object to be inspected.

The focal point displaced upstream of the objective is the point in which all the imaging beams intersect. In other words, the origin of the angle of view is not located in the objective but upstream of the objective.

In particular this objective can be aligned with or focused on a plane or a region which is located between the monitoring device and the object to be inspected. In this way in particular the image capture can also be improved in the case of an illumination device located between the monitoring device and the object.

In particular this objective can place a virtual observer upstream of the objective, or between the object and the objective. The objective can have a planar sharpness plane, or a curved sharpness plane, which in the preferred case follows the shape of the container to be inspected.

Thus the image capturing device preferably has a pupil arranged in front in the direction of the object to be inspected.

In a further preferred embodiment the illumination device is designed as a flat body. In this case, as mentioned above, this flat body is in particular arranged between the monitoring device and the object to be inspected. This flat body is advantageously arranged in such a way that it is perpendicular to an optical axis of the monitoring device. In an advantageous embodiment the illumination device has a thickness (viewed along the optical axis) which is greater than 0.2 mm, preferably greater than 0.4 mm, preferably greater than 0.6 mm, preferably greater than 0.8 mm and particularly preferably greater than 1.0 mm. In a further preferred embodiment the illumination device has a thickness which is less than 40 mm, preferably less than 20 mm, preferably less than 15 mm, preferably less than 10 mm.

These thicknesses have been shown to be particularly advantageous in order on the one hand to maintain monitoring through the opening of the illumination device and in order on the other hand to provide a sufficient thickness to accommodate light sources or also a sufficient thickness for coupling in of light.

In a further advantageous embodiment the surface area of the illumination device is greater than a cross-section of the object to be inspected. This means that the illumination device can also illuminate the complete object from several sides. In this way a complete illumination of the inner wall region and also of the base region of the object, in particular a can, is achieved.

In a further advantageous embodiment the object has at least partially non-transparent walls. As mentioned above, the object may be in particular cans, aluminium bottles, spray bottles and the like.

In a further advantageous embodiment the illumination device has a transit region through which a beam path extending from the object towards the monitoring device can pass. In this case this transit region can be designed for example as a hole in the illumination device and can preferably have a diameter which is between 1 mm and 20 mm.

This diameter is advantageously greater than 1 mm, advantageously greater than 2 mm, advantageously greater than 3 mm. In a further embodiment the diameter is less than 20 mm, preferably less than 17 mm, preferably less than 15 mm, preferably less than 10 mm and particularly preferably less than 7 mm. The virtual pupil preferably has a diameter which is greater than 1 mm, preferably greater than 2 mm, and particularly preferably greater than 3 mm. The virtual pupil preferably has a diameter which is less than 10 mm, preferably less than 8 mm, preferably less than 6 mm, and particularly preferably less than 5 mm.

In this case this transit region can be formed as an actual hole, but it would also be possible that the transit region is only designed as a transparent area which is transmissive or transparent at least for light in the visible wavelength range. The transparent region is preferably anti-reflective. In a further advantageous embodiment this hole has a circular cross-section.

In a particularly preferred embodiment the image capturing device and/or an objective of the image capturing device is focused in the monitoring direction in such a way that the focus or the origin of the angle of view is located in a region of the illumination device and in particular in the region of the transit region. Therefore the focus or the origin of the angle of view is preferably located in the region of this transit region. In this case it is possible that the light is focused in the region of this opening. However, it is also possible that the illumination device is offset relative to the above transit region in the direction of the optical axis, for example into the centre of the thickness of a protective glass pane located in front of the illumination device.

Therefore the illumination device particularly preferably has a very small hole, and this hole or the through opening of the illumination device or of the lighting element is preferably arranged relative to the objective with the pupil arranged in front so that the location of the pupil, the location of the origin of the angle of view, occurs in or close to the through hole of the illumination device. In this preferred embodiment all imaging beams intersect in the pupil arranged in front and thus they pass through the said hole.

As mentioned, this hole in the illumination device can also be as small as the necessary pupil diameter. As mentioned, in this case diameters of a few millimetres are possible. However, in order also to simplify adjustment of the pupil the hole or the through opening can also have a diameter of for instance 10 mm. The diffuse light illuminates the object, in particular the can, substantially uniformly.

In a further preferred embodiment a shutter device is arranged between the illumination device and the monitoring device. In a further preferred embodiment a device is arranged by which scattered light coming from the illumination device is kept away from the monitoring device. This may be an optically opaque shutter. This may be mirrored for example on their outer surfaces. Particularly preferably this shutter or this element is designed in a funnel shape.

Furthermore, the present invention is directed to a method for inspecting objects and in particular containers having an opening. In this case these objects are transported along a predetermined transport path by a transport device and at least one region of an inner wall of the object is monitored by a monitoring device through an opening of the objects, wherein the monitoring device is suitable and intended for capturing spatially resolved images, and wherein the apparatus has an illumination device which illuminates at least one region of the inner wall of the object. According to the invention the illumination device is arranged between the monitoring device and the object.

Particularly preferably the illumination device illuminates both at least one portion of the inner walls of the object and also of a base of the object. The illumination device preferably illuminates substantially the entire inner wall of the object and preferably also the entire base. In a further preferred method the illumination device also illuminates a rim of the mouth of the object, in particular a rim of the mouth of a can to be inspected.

In a further preferred method the object is transported during its inspection. Particularly preferably the object is illuminated by pulsed light.

In a further preferred method a pupil of the monitoring device is arranged in front of the monitoring device and in particular arranged in front in the direction of the object to be inspected. Therefore in particular an objective is focused onto a plane which is arranged between the monitoring device and the object. In a further preferred method an objective of the monitoring device is set in such a way that it is focused in the region of a through opening provided in the illumination device. This may be in particular the origin of the angle of view.

BRIEF DESCRIPTION OF THE DRAWINGS

Further advantages and embodiments are disclosed by the appended drawings.

In the drawings:

FIG. 4a shows a detail of a funnel-shaped shutter element;

DETAILED DESCRIPTION OF THE DRAWING

Figure 1:
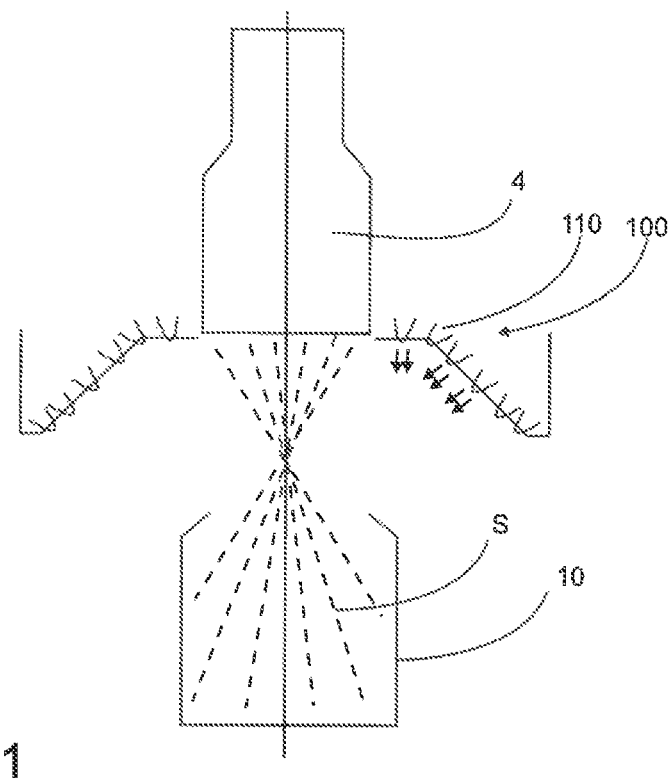
FIG. 1 shows an apparatus for inspecting containers according to the internal prior art in the name of the applicant.

FIG. 1 shows an apparatus 100 according to the internal prior art in the name of the applicant for inspecting cans. In this case the reference numeral 10 relates to the object to be inspected and in particular a can. The reference 4 designates a monitoring device which is arranged above the can in the longitudinal direction L of the can 10. In this case this monitoring device 4 is focused on a pupil region P which is located between the can 10 and the monitoring device 4. In other words the origin of the angle of view is located between the monitoring device and the object to be inspected.

The monitoring device has a plurality of light sources 110, for example LEDs, which are arranged here in a ring around the optical axis O. During illumination of the object 10 reflections can occur, which in turn strike the image capturing device 4.

Figure 2:
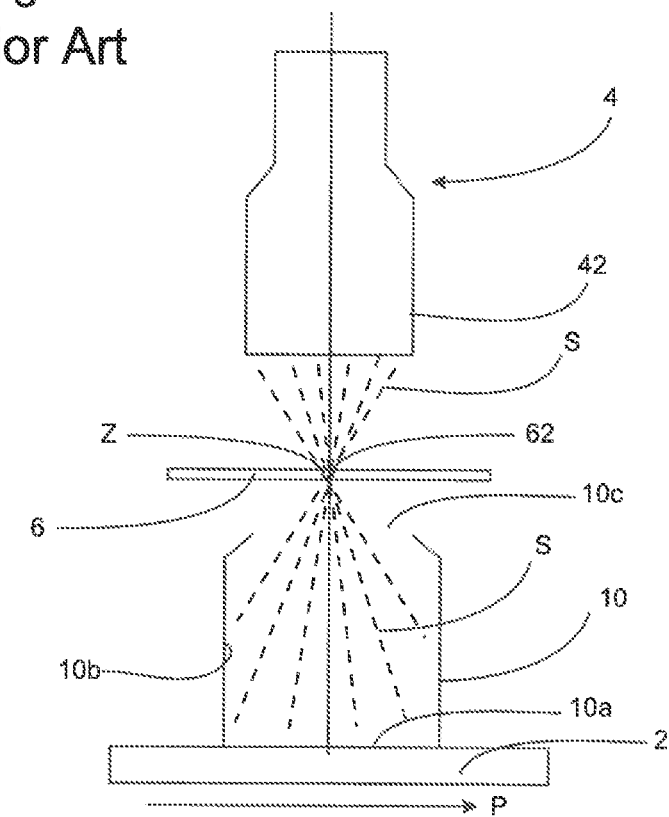
FIG. 2 shows an apparatus according to the invention for inspecting objects in a first embodiment.

FIG. 2 shows an apparatus 1 according to the invention for inspecting cans in a first embodiment. Here too a monitoring device 4 is provided, which has an objective 42. This objective is oriented or set in such a way that a focus or a pupil Z occurs between the objective and the can 10 to be inspected. The reference S designates the light beams emanating from the object. These light beams are collected by the objective and are imaged in a spatially resolved image on the objective image side. The reference 10c designates an opening of the object or of the can, through which monitoring and also illumination takes place.

The reference 6 designates an illumination device which is arranged in a plane E between the monitoring device 4 and the can 10. It will be recognised that the illumination device is designed as a flat element which, however, has a larger cross-section than the object 10 to be inspected. In particular the cross-section of the flat element perpendicular to the optical axis is greater than the cross-section of the object perpendicular to the optical axis. This illumination device 6 emits in particular diffuse light, so that the inner wall 10b and also the base 10a are uniformly illuminated by the illumination device 6. In this way the illumination device is arranged very close to the can 10 and can illuminate the can completely in a particularly favourable manner. Furthermore, the illumination device may be suitable, for example in the case of open cans, for illuminating the flange thereof.

Furthermore, the illumination device 6 has a transit region or a through opening 62 through which beams can pass. On the one hand this through opening 62 is located in a region of the optical axis, and on the other hand the opening is selected as large that the pupil or the focus can be placed in this opening. In this way a complete image of the inner region of the can 10 can be captured.

The reference numeral 2 designates a transport device which transports the objects 10 in the transport direction T. In the variant shown in FIG. 2, this transport takes place in a straight line. The monitoring device 4 preferably includes an image capturing device, which produces an image in each case when the can 10 is located directly below the monitoring device 4, preferably when an axis of symmetry of the can 10 coincides with the optical axis O of the image capturing device.

The reference numeral 2 designates a transport device which transports the objects 10 in the transport direction T. In the variant shown in FIG. 2 this transport takes place in a straight line. The image capturing device 4 preferably produces an image in each case when the can 10 is located directly below the image capturing device 4, preferably when an axis of symmetry of the can 10 coincides with the optical axis O of the image capturing device.

The diffuse light from the illumination device results in the object or the can being uniformly illuminated. If the monitoring device has a specific type of protection (for example with regard to environmental influences such as dust, water and the like), it is also possible to cover the through opening 62, for example by means of a transparent glass or plastic pane. However, in this way dust in the region of the through openings or also scratches on this pane could lower the contrast in the camera image due to the light being scattered on the scratch or on the dust in the region of the through opening.

In order to prevent this from occurring in this embodiment it would also be possible to use a suitable opaque shutter described in greater detail below between the through opening and the objective. In this case, as described in greater detail below, it is possible that the part of such a funnel-shaped shutter directed towards the illuminating surface is mirrored in order to be able to compensate for a possible brightness gradient which could be produced at the through opening.

Figure 3:
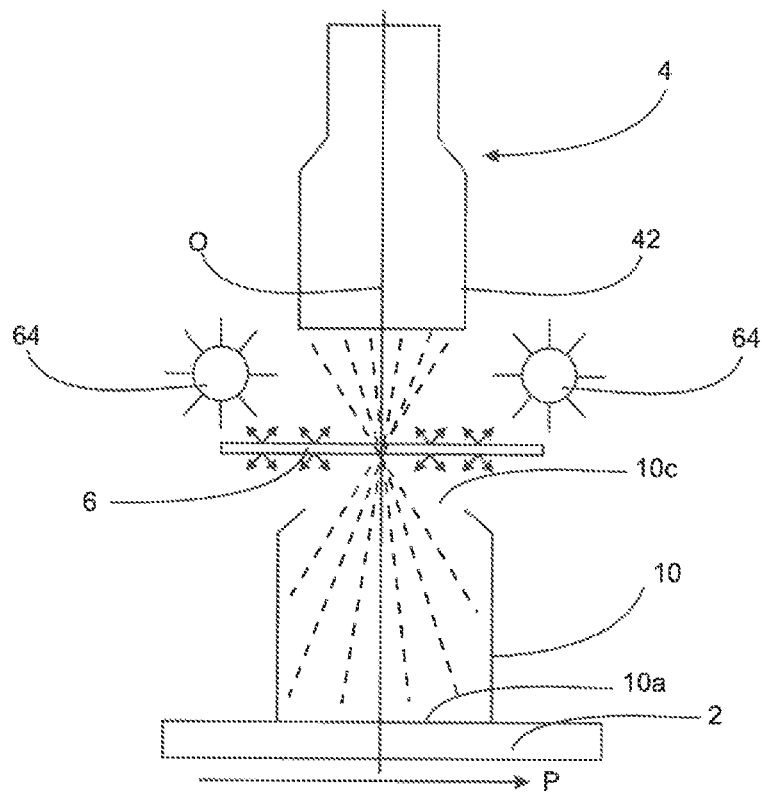
FIG. 3 shows an apparatus for inspecting objects in a second embodiment.

FIG. 3 shows a further embodiment of the apparatus according to the invention. Whilst in the embodiment illustrated in FIG. 2 the illumination device is an active or self-illuminating element, in the embodiment illustrated in FIG. 3 it is a passive element which is illuminated by two light sources 64. These two light sources 64 here are arranged above the illumination device in the direction of the optical axis O and thus illuminate the illumination device 6 from above. In the embodiment shown in FIG. 3 it is possible that the illumination device reflects light in all directions. However, it would also be possible that the illumination device itself is designed for instance in the manner of a partially transparent mirror, so that light is not radiated upwards, but only downwards.

Figure 4:
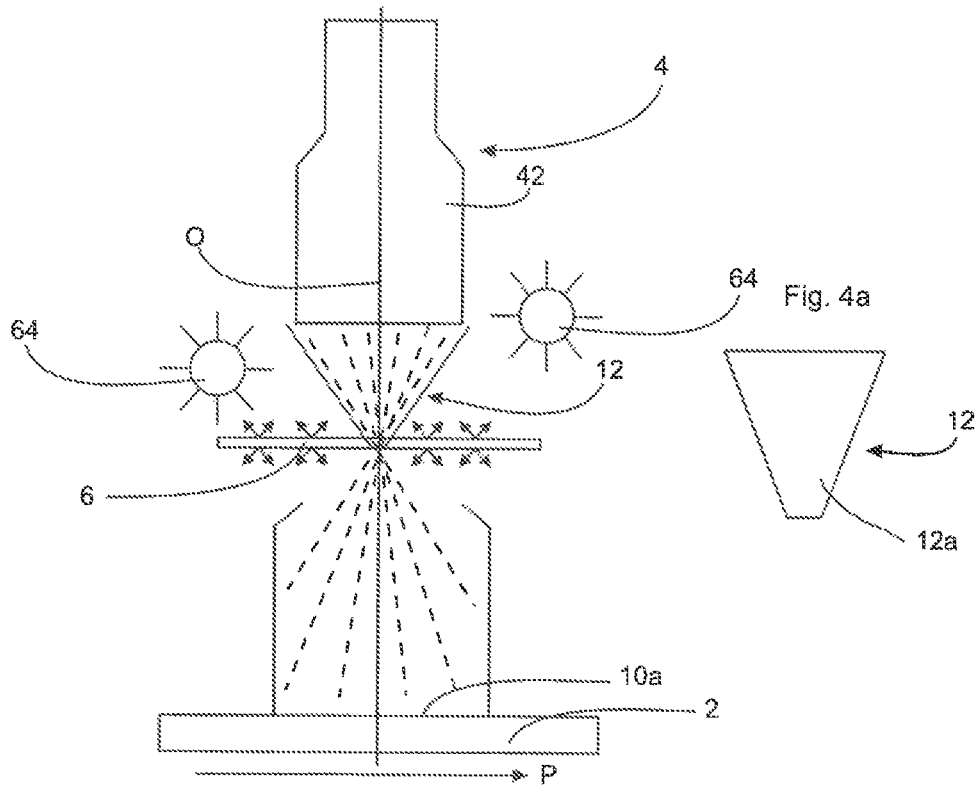
FIG. 4 shows an apparatus for inspecting objects in a third embodiment.

FIG. 4 shows an embodiment similar of the embodiment shown in FIG. 3. However, an optical shutter 12 is additionally provided here. This can than be designed as a funnel-shaped element and in particular could protect the image capture against scattered light. In this case it is possible that an outer surface 12a of this shutter is mirrored in order thus, as mentioned above, to increase the contrast. This shutter device is preferably designed as an optically opaque shutter. FIG. 4a shows a representation of this funnel-shaped element 12.

Figure 5:
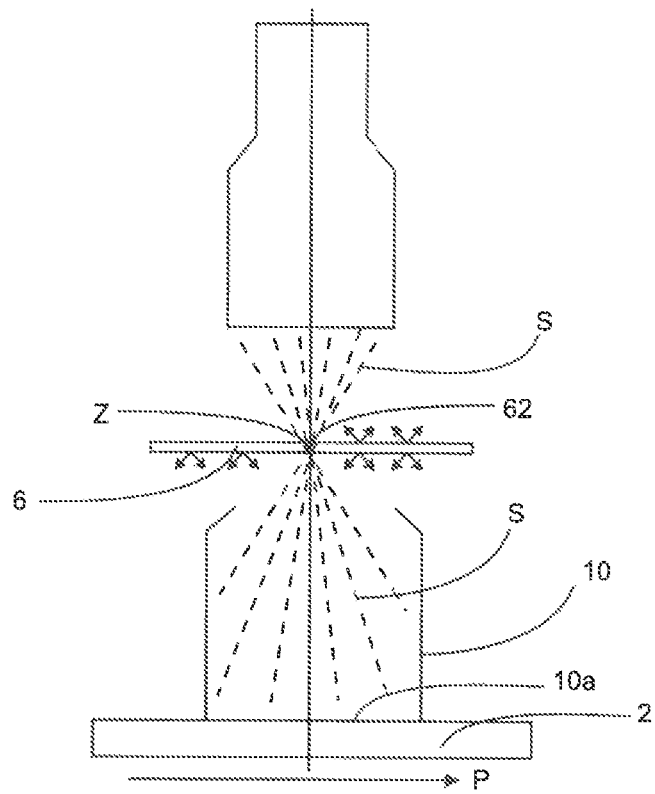
FIG. 5 shows an apparatus for inspecting objects in a fourth embodiment.

FIG. 5 shows a further embodiment of the apparatus according to the invention. In this embodiment the illumination device 6 is luminous at both ends, that is to say it illuminates both upwards and also downwards. Here too, it would again be possible that upwardly exiting light is kept away from the image capturing device.

Figure 6:
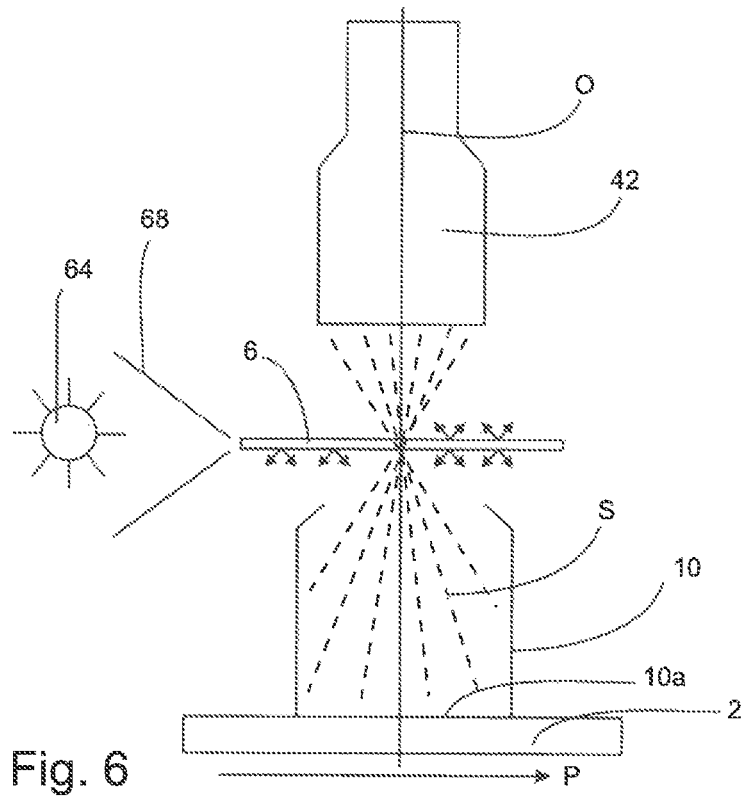
FIG. 6 shows an apparatus for inspecting objects in a fifth embodiment.

In the embodiment shown in FIG. 6 an illumination device 64 is again provided, which couples light laterally into the illumination device 6 by means of an incoupling element 68. The illumination device 6 in turn emits diffuse light in the direction of the object 10 to be inspected.

Figure 7:
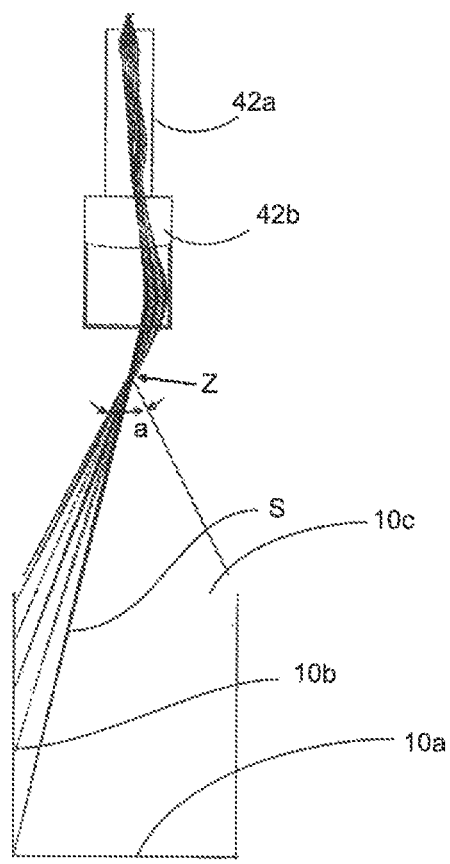
FIG. 7 shows a representation to illustrate the principle of a pupil arranged in front.

FIG. 7 illustrates the principle described here of the pupil arranged in front or the focal point arranged in front. The image capturing device here has two objective components 42a, 42b, which in this case are arranged one after the other along the optical axis. This arrangement provides that the entire optical unit has two focal points, wherein here a focal point Z is arranged upstream of the objective component 42b. The beams originating from the base 10a and the side wall 10b of the object are imaged by means of the objective component onto an image capturing element (not shown). The reference a designates the angle of view, and the reference Z here designates the location or intersection point of the angle of view a.

In this case the light beams S, which are emitted by the object and reach the monitoring device, are shown at least partially. The characteristic of the monitoring device 42a/42b requires that the light beams which enter it are concentrated and focused through a location Z outside the monitoring device. Other light beams emanating from the object do not enter the monitoring device. The light beams S on the object side are imaged into a spatially resolved image on the image side in the monitoring device.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 transport device
4 monitoring device
6 illumination device
10 object to be inspected, can
10a base
10b inner wall
10c mouth
12 shutter
12a outer wall of the shutter
42 objective
62 through opening
64 light sources, illumination device 68 incoupling element
100 apparatus
110 light sources
E plane
O optical axis
Z pupil region
P transport direction
S light beams
L longitudinal direction
a angle of view

The invention claimed is:

1. An apparatus for inspecting objects which have an opening, comprising a transport conveyor configured to transport the objects along a predetermined transport path, an imaging monitor which is configured to monitor at least one region of an inner wall of the object through the opening of the object, wherein the imaging monitor is configured to capture spatially resolved images, wherein the apparatus has an illuminator configured to illuminate at least one region of the inner wall wherein the illuminator is arranged between the imaging monitor and the object, wherein an imager is focused in the monitoring direction such that the pupil region and/or focal point is located in the center of a transit region of the illuminator, wherein the object to be inspected is a can having a non-transparent base and side walls, and wherein a beam path extending from the object towards the monitoring. device pass through the transit region and the transit region is configured as a hole in the illumination device and has a diameter which is between 1 mm and 20 mm.

2. The apparatus according to claim 1, wherein the illuminator is configured to emit diffuse light.

3. The apparatus according to claim 2, wherein the imaging monitor has an objective with a pupil arranged in front.

4. The apparatus according to claim 3, wherein the illuminator is designed as a planar body or has a planar body that is arranged perpendicular to an optical axis of the imaging monitor and has, viewed along the optical axis, a thickness which is greater than 0.2 mm, and less than 40 mm.

5. The apparatus according to claim 4, wherein a surface of the illuminator is greater than a cross-section of the object to be inspected.

6. The apparatus according to claim 2, wherein the illuminator has a transit region through which a beam path extending from the object towards the imaging monitor can pass.

7. The apparatus according to claim 6, wherein the transit region is configured as a hole in the illuminator and has a diameter which is between 1 mm and 20 mm.

8. The apparatus according to claim 2, wherein a shutter device is arranged between the illuminator and the imaging monitor.

9. The apparatus according to claim 1, wherein the imaging monitor has an objective with a pupil arranged in front.

10. The apparatus according to claim 1, wherein the illuminator is designed as a planar body or has a planar body, that arranged perpendicular to an optical axis of the imaging monitor and has, viewed along the optical axis, a thickness which is greater than 0.2 mm, and less than 40 mm.

11. The apparatus according to claim 10, wherein a surface of the illuminator is greater than a cross-section of the object to be inspected.

12. The apparatus according to claim 1, wherein the object has, at least partially, non-transparent walls.

13. The apparatus according to claim 1, wherein a shutter device is arranged between the illuminator and the imaging monitor.

14. A method for inspecting objects which have an opening, wherein the objects are transported by a transport conveyor along a predetermined transport path and at least one region of an inner wall of the object is monitored by an imaging monitor through the opening of the objects, wherein the imaging monitor is configured for capturing spatially resolved images, wherein the apparatus has an illuminator configured to illuminate at least one region of the inner wall wherein the illuminator is arranged between the imaging monitor and the object, wherein an imager is focused in the monitoring direction such that the pupil region and/or focal point is located in the center of a transit region of the illuminator, wherein the object to be inspected is a can having a non-transparent base and side walls, and wherein a beam path extending from the object towards the monitoring device pass through the transit region and the transit region is configured as a hole in the illumination device and has a diameter which is between 1 mm and 20 mm.

15. The method according to claim 14, wherein a pupil of the imaging monitor is arranged in front of the imaging monitor.

* * * * *